US012115544B2

(12) United States Patent
Son et al.

(10) Patent No.: US 12,115,544 B2
(45) Date of Patent: Oct. 15, 2024

(54) PUMP DISPENSER

(71) Applicant: SUN & L CO., LTD., Incheon (KR)

(72) Inventors: Dae Sik Son, Gyeongsangnam-do (KR); Young Min Jo, Gyeongsangnam-do (KR); Yun Je Kang, Busan (KR); Ji Hyeon Park, Gyeongsangnam-Do (KR); Jae Kwang Yu, Gyeongsangnam-Do (KR); Eun Mi Lee, Gyeongsangnam-Do (KR)

(73) Assignee: SUN & L CO., LTD., Incheon (KR)

( * ) Notice: Subject to any disclaimer, the term of this patent is extended or adjusted under 35 U.S.C. 154(b) by 227 days.

(21) Appl. No.: 17/758,313

(22) PCT Filed: Aug. 20, 2020

(86) PCT No.: PCT/KR2020/011105
§ 371 (c)(1),
(2) Date: Jul. 1, 2022

(87) PCT Pub. No.: WO2021/230429
PCT Pub. Date: Nov. 18, 2021

(65) Prior Publication Data
US 2023/0026887 A1    Jan. 26, 2023

(30) Foreign Application Priority Data

May 14, 2020  (KR) .......................... 10-2020-0057666

(51) Int. Cl.
 *B05B 11/10* (2023.01)
 *B05B 3/00* (2006.01)
(52) U.S. Cl.
 CPC .......... *B05B 11/1077* (2023.01); *B05B 3/001* (2013.01); *B05B 11/1047* (2023.01); *B05B 11/1059* (2023.01); *B05B 11/1073* (2023.01)
(58) Field of Classification Search
 CPC . B05B 11/1077; B05B 3/001; B05B 11/1047; B05B 11/1059; B05B 11/1073;
(Continued)

(56) References Cited

U.S. PATENT DOCUMENTS

| 4,220,264 A |   | 9/1980 | Gamadia |
|---|---|---|---|
| 4,991,746 A | * | 2/1991 | Schultz ............... B05B 11/1023 222/321.3 |

(Continued)

FOREIGN PATENT DOCUMENTS

| CN | 103649534 A | 3/2014 |
|---|---|---|
| CN | 110002094 A | 7/2019 |

(Continued)

OTHER PUBLICATIONS

Chinese Office Action regarding Patent Application No. 202080092075.0, dated Jul. 27, 2023 (including English machine translation).

(Continued)

*Primary Examiner* — Vishal Pancholi
(74) *Attorney, Agent, or Firm* — AJU IP Global, PLLC

(57) ABSTRACT

Disclosed is the invention of a pump dispenser wherein a deformation prevention locking part induces a chaplet to move in the axial direction in a housing at the time of rotation of a head part, thereby allowing or restricting an operation of pressing a head part while preventing the deforming of an elastic member. The disclosed pump dispenser comprises: a cap part fastened to a container; a housing which is provided at the cap part and in which a content stored in the container remains in a dischargeable state; a shaft received in the housing so as to be movable in the axial direction, the shaft including a head part for discharging the content remaining in the housing to the outside through a pressing operation by an external force; a chaplet provided in the housing such that the shaft is inserted so as to be able to extend therethrough, the chaplet allowing or blocking the movement of the shaft on the basis of the angle of rotation of the head part; an elastic member provided on the circumference surface of the shaft and elastically supporting the chaplet and the head part; and a deformation prevention locking part for inducing the chaplet to move in the axial direction in the housing at the time of rotation of the head part, thereby allowing or restricting an (Continued)

operation of pressing the head part while preventing the deformation of the elastic member.

6 Claims, 12 Drawing Sheets

(58) Field of Classification Search
CPC ............ B05B 11/1023; B05B 11/1069; B05B 11/1074; F16F 1/06; F16F 1/028
See application file for complete search history.

(56) References Cited

U.S. PATENT DOCUMENTS

| | | | | |
|---|---|---|---|---|
| 6,045,008 | A * | 4/2000 | Gonzalez Fernandez | B05B 11/1023 222/321.9 |
| 9,199,257 | B2 * | 12/2015 | Wang | B05B 11/106 |
| 10,960,423 | B1 * | 3/2021 | Kang | B05B 11/1077 |
| 2015/0090741 | A1 * | 4/2015 | Laffey | F16F 1/025 222/321.9 |

FOREIGN PATENT DOCUMENTS

| | | |
|---|---|---|
| CN | 209142745 U | 7/2019 |
| CN | 110436043 A | 11/2019 |
| JP | 2015209267 A | 11/2015 |
| KR | 200311476 Y1 | 5/2003 |
| KR | 200408922 Y1 | 2/2006 |
| KR | 101107519 B1 | 1/2012 |
| KR | 101251069 B1 | 4/2013 |
| KR | 10-2015-0107253 A | 9/2015 |

OTHER PUBLICATIONS

International Search Report (English) of the International Searching Authority issued in PCT/KR2020/011105, mailed Jan. 29, 2021; ISA//KR.

* cited by examiner

PUMP DISPENSER

CROSS-REFERENCE TO RELATED APPLICATION

This application is a 371 U.S. National Phase of International Application No. PCT/KR2020/011105, filed Aug. 20, 2020, which claims priority to Korean Application No. 10-2020-0057666, filed May 14, 2020. The entire disclosures of the above applications are incorporated herein by reference.

TECHNICAL FIELD

The present invention relates to a pump dispenser, and more particularly, to a pump dispenser in which a deformation prevention locking part guides a chaplet to move in an axial direction of a housing, thereby allowing or restricting a pressing operation of a head part while preventing deformation of an elastic member.

BACKGROUND ART

Generally, pump dispensers are devices for discharging a predetermined amount of content stored inside a container by a pressing force, and pump dispensers are known to be applied to various types of containers for storing cosmetics, perfumes, medicines, food, and the like.

In such a pump dispenser, when a user presses a head part, a shaft is lowered against an elastic force of an elastic member and the content contained in a housing is discharged to a nozzle through a through-hole and a connecting pipe. In addition, when the user releases the head part, the shaft rises with the elastic force of the elastic member, the through-hole is closed to block the content, and a vacuum is formed inside the housing, and thus the content contained in the container fills the housing.

However, in the conventional pump dispenser, since a metallic coil elastic member is built into the housing into which the content is introduced, there is a problem in that the coil elastic member is always in contact with the content, and thus the coil elastic member may be corroded or deformed and the content may be altered due to a chemical reaction between the coil elastic member and the content.

Further, when the conventional pump dispenser is distributed while the head part is constrained to the housing to prevent a pressing operation of the head part, there is a problem in that, since the elastic member is left in a compressed state for a long time, the elastic force of the elastic member is degraded.

Therefore, there is a need to solve the above problems.

As a related art, Korean Patent Registration No. 10-1107519 (Registered on Jan. 12, 2012, Title: Fluid Pump Dispenser) is disclosed.

DISCLOSURE

Technical Problem

The present invention is directed to providing a pump dispenser in which a deformation prevention locking part guides a chaplet to move in an axial direction of a housing, thereby allowing or restricting a pressing operation of a head part while preventing deformation of an elastic member.

Technical Solution

One aspect of the present invention provides a pump dispenser including a cap part fastened to a container, a housing which is provided at the cap part and in which a content stored in the container remains and is dischargeable, a shaft which is accommodated in the housing to be movable in an axial direction of the housing and includes a head part for discharging the content remaining in the housing outward through a pressing operation by an external force, a chaplet that is provided in the housing for the shaft to be inserted to pass through the housing and allows or blocks movement of the shaft on a basis of a rotation angle of the head part, an elastic member that is provided on a circumferential surface of the shaft and elastically supports the chaplet and the head part, and a deformation prevention locking part that guides the chaplet to move in the axial direction of the housing at the time of rotation of the head part and allows or restricts the pressing operation of the head part while preventing deformation of the elastic member.

The head part may be inserted or prevented from being inserted in an axial direction of the chaplet on the basis of the rotation angle by a rotation insertion guide part, and the rotation insertion guide part may include a slide protrusion formed to protrude from a circumferential surface of the head part, a slide groove formed to be recessed in the axial direction in an inner surface of the chaplet for the slide protrusion to be slidably fitted in the chaplet, and a locking support groove formed to communicate with an end part of the slide groove in a circumferential direction and configured to lock and support the slide protrusion.

The deformation prevention locking part may include a helical groove formed in an inner surface of the housing to be recessed in a helical trace, and a moving protrusion formed to protrude from a circumferential surface of the chaplet to be movably fitted in the helical groove.

A locking member may be formed to protrude from the helical groove such that the moving protrusion is allowed to be moved by an external force greater than or equal to a set force.

An inflow prevention part may prevent the content from flowing between the housing and the chaplet, and the inflow prevention part may include a plurality of close-contact moving protrusions formed on the circumferential surface of the chaplet to be movable while in close contact with an inner surface of the housing, and a pressure guide part configured to guide the chaplet to press the housing when the chaplet is moved to restrict the pressing operation of the head part.

The elastic member may include a first support ring configured to be accommodated and supported in the chaplet, a second support ring spaced apart from the first support ring and configured to support the head part to be pressed, and a uniform elasticity forming part provided between the first support ring and the second support ring and configured to form a uniform elastic restoring force when the head part is pressed by the external force.

The uniform elasticity forming part may include a plurality of elasticity providing parts vertically disposed between the first support ring and the second support ring to provide an elastic force, wherein pairs of the elasticity providing parts cross obliquely, and posture maintaining parts which are horizontally connected to parts adjacent to the vertically disposed elasticity providing parts, and that move vertically to vary inclinations of the elasticity providing parts such that a posture is maintained when a pressing force is applied to the second support ring.

Advantageous Effects

A pump dispenser according to the present invention has a structure in which a deformation prevention locking part guides a chaplet to move in an axial direction of a housing, thereby allowing or restricting a pressing operation of a head part while preventing deformation of an elastic member, and thus an elastic force of the elastic member can be maintained even when the elastic member is left for a long time while the pressing operation of the head part is restricted in the distribution process, thereby improving durability.

MODES OF THE INVENTION

Figure 1:
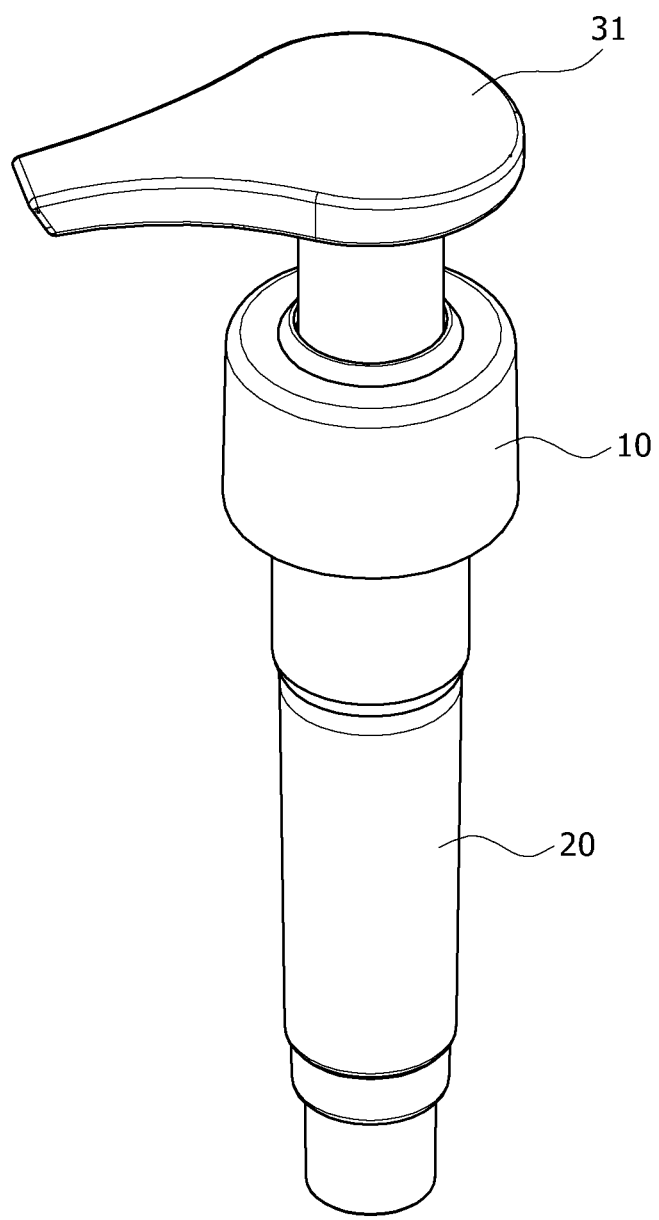
FIG. 1 is a perspective view illustrating a pump dispenser according to an embodiment of the present invention.

Hereinafter, embodiments of a pump dispenser according to the present invention will be described with reference to the accompanying drawings. In this process, thicknesses of lines, sizes of components, and the like illustrated in the drawings may be exaggerated for clarity and convenience of description.

Further, some terms which will be described below are defined in consideration of functions in the present invention and meanings may vary depending on, for example, a user or operator's intentions or customs. Therefore, the meanings of these terms should be interpreted based on the scope throughout this specification.

Figure 2:
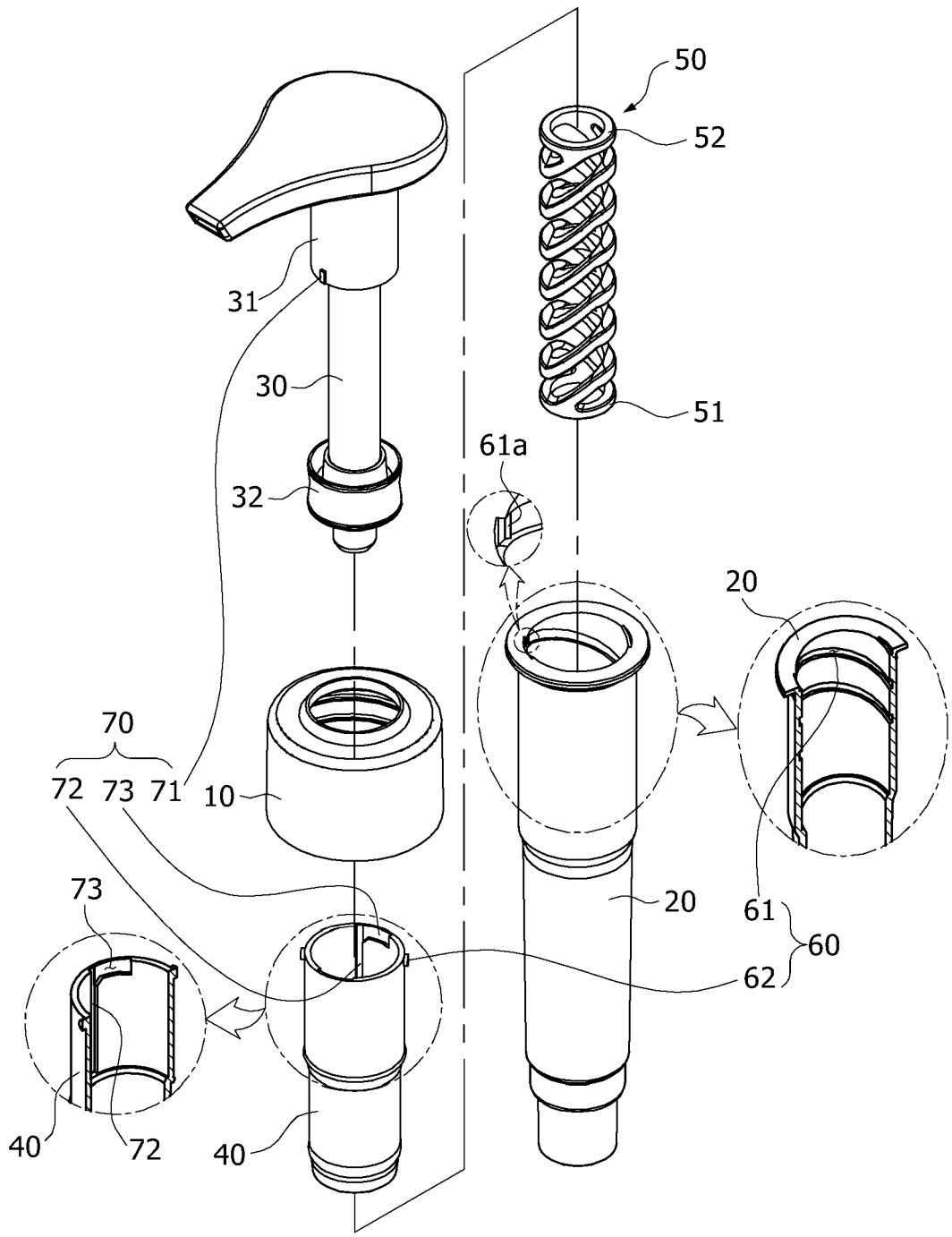
FIG. 2 is an exploded perspective view illustrating the pump dispenser according to the embodiment of the present invention.
Figure 3:
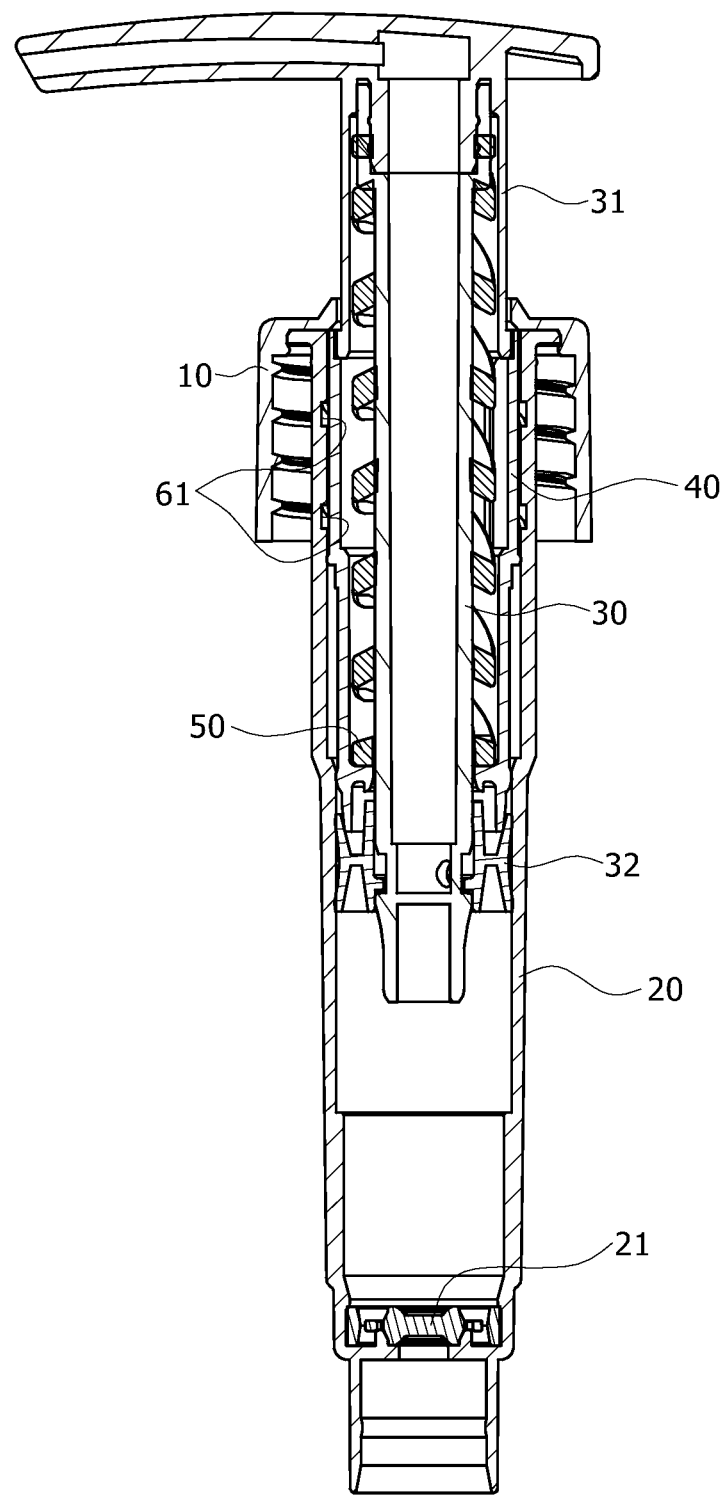
FIG. 3 is a cross-sectional view illustrating the pump dispenser according to the embodiment of the present invention.
Figure 4:
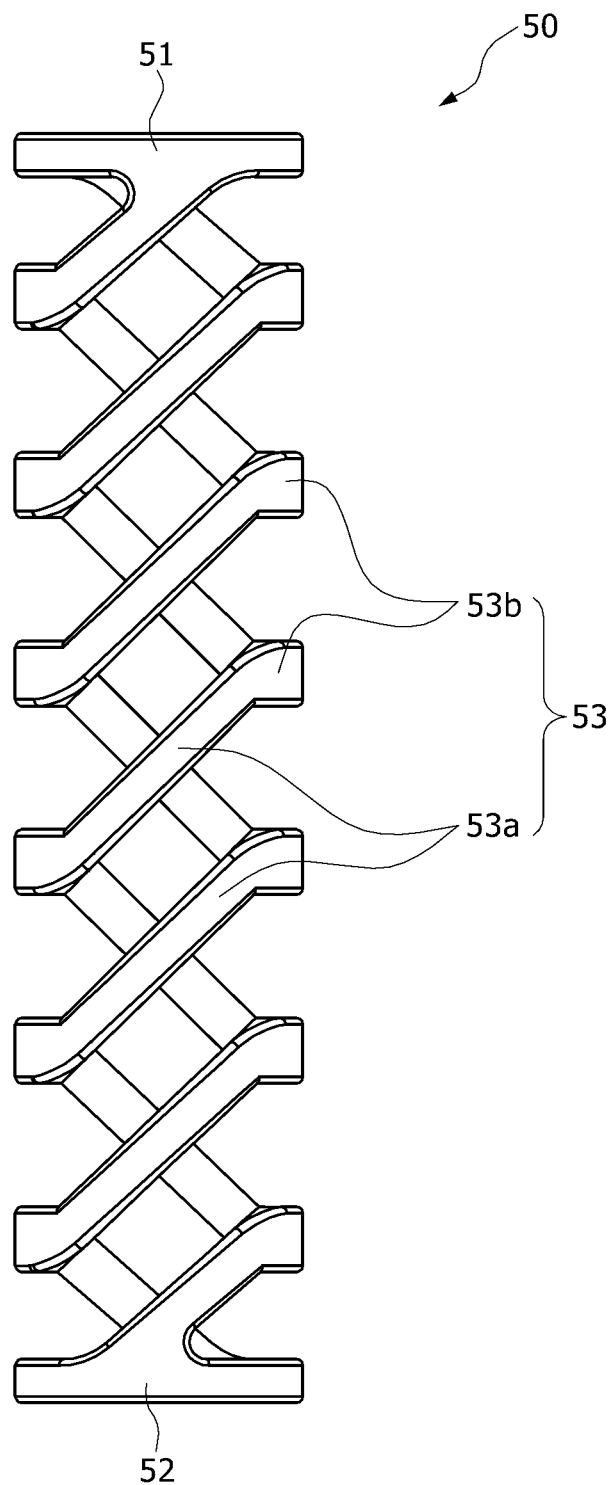
FIG. 4 is a cross-sectional view illustrating an elastic member in the pump dispenser according to the embodiment of the present invention.
Figure 5:
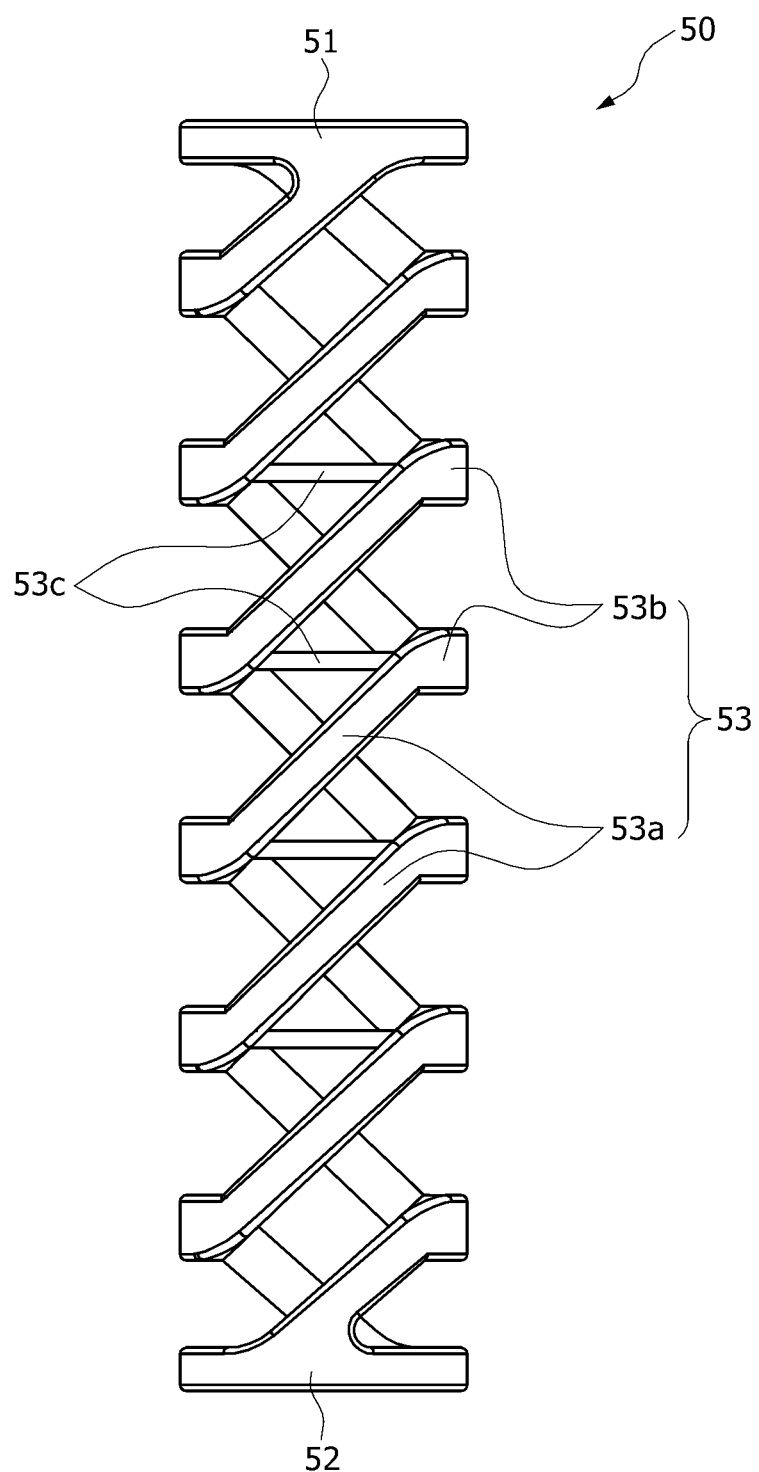
FIG. 5 is a side view illustrating a modified example of the elastic member in the pump dispenser according to the embodiment of the present invention.
Figure 6A:
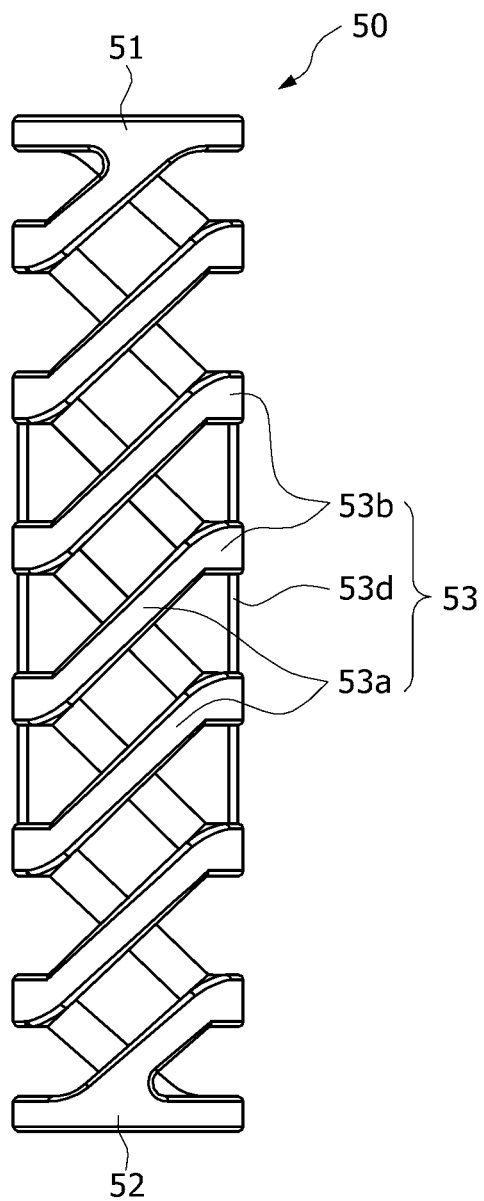
FIGS. 6A and 6B are a side view illustrating another modified example of the elastic member in the pump dispenser according to the embodiment of the present invention.
Figure 6B:
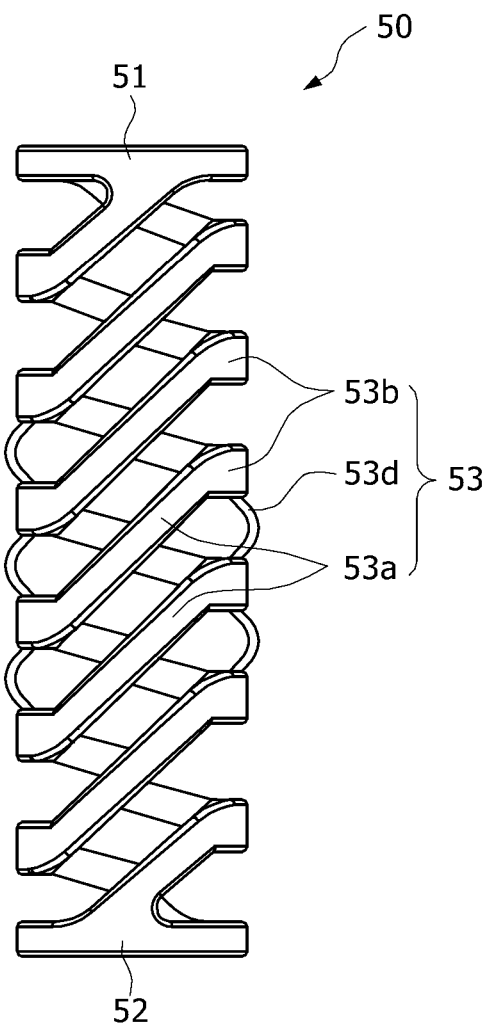
Figure 7A:
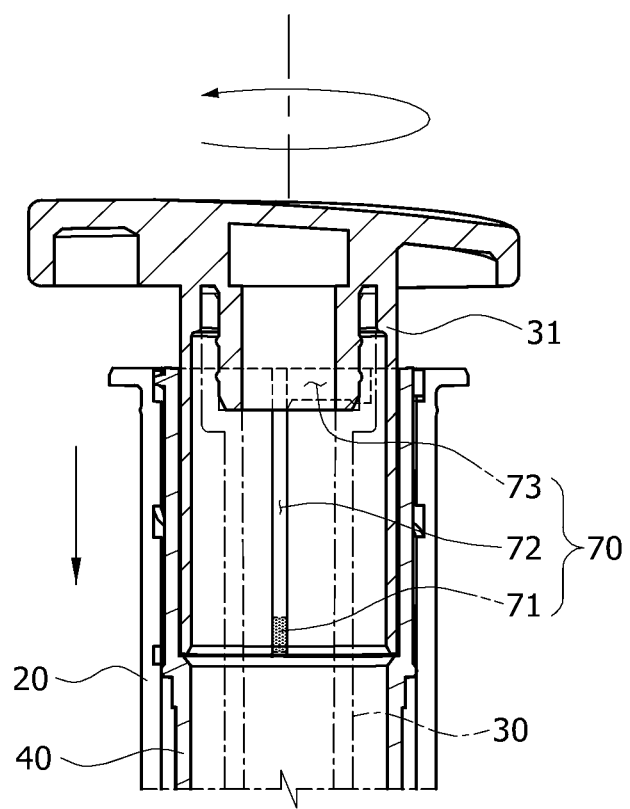
FIGS. 7A and 7B are an operational view illustrating an operating state of a rotation insertion guide part in the pump dispenser according to the embodiment of the present invention.
Figure 7B:
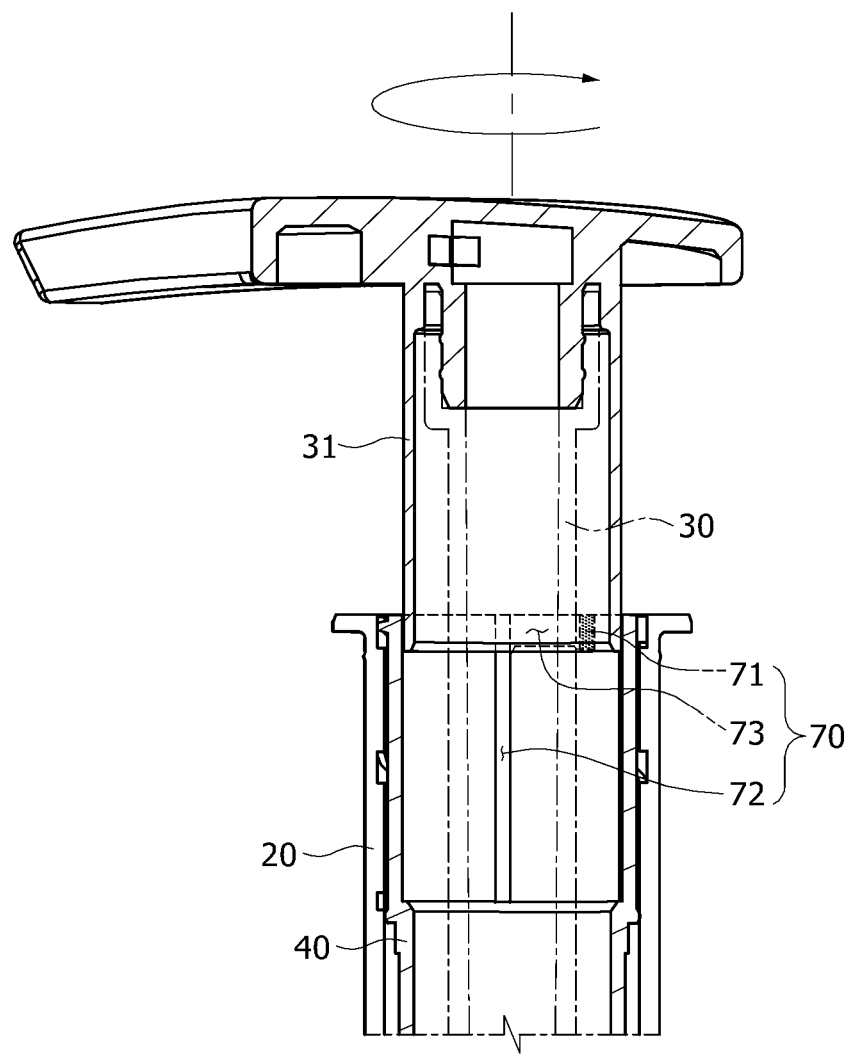
Figure 8A:
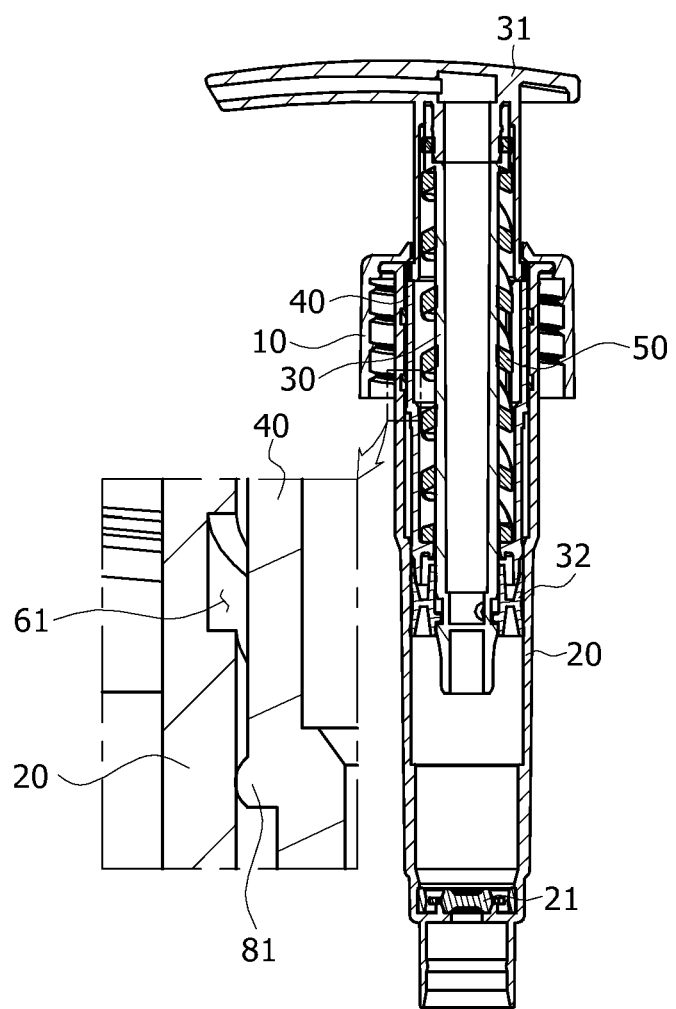
FIGS. 8A and 8B are an operational view illustrating an operating state of a deformation prevention locking part in the pump dispenser according to the embodiment of the present invention.
Figure 8B:
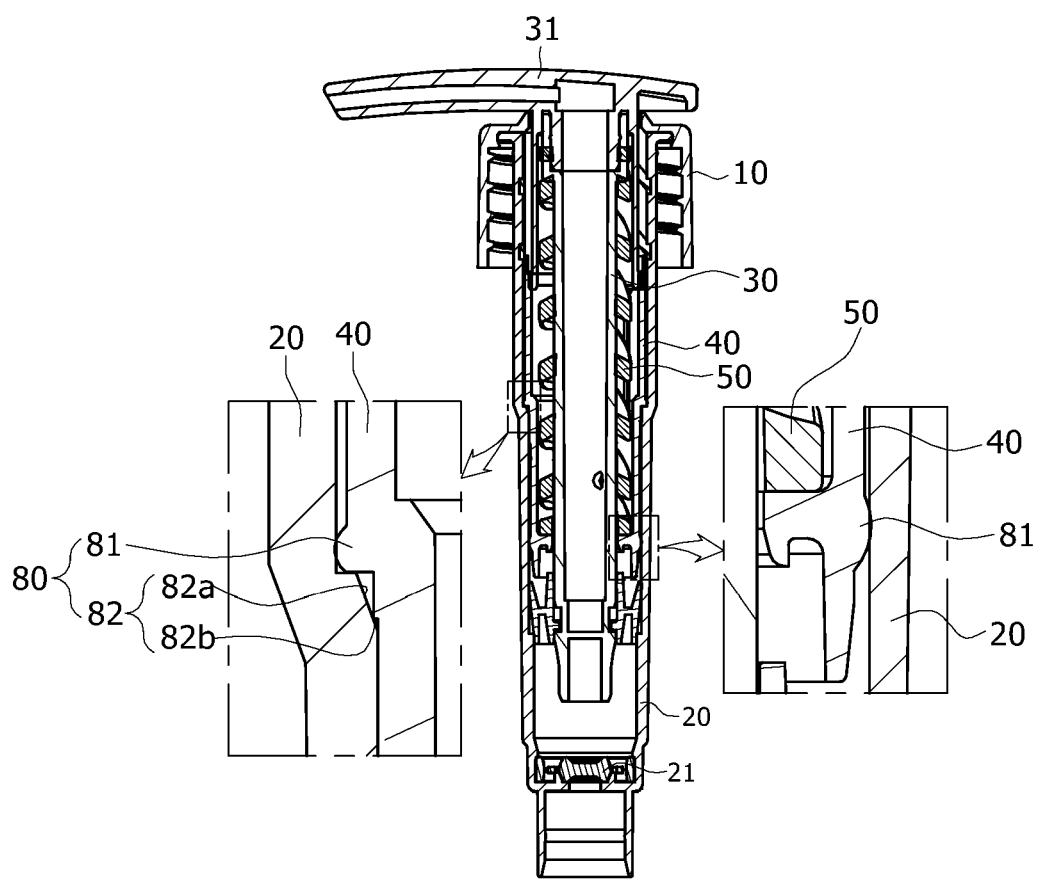
Figure 9:
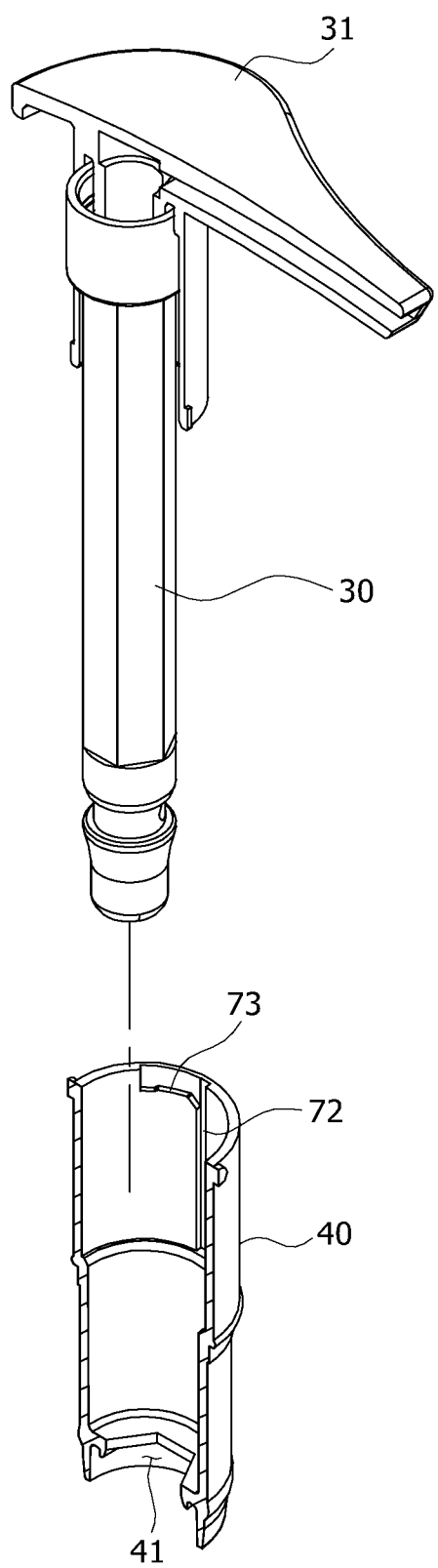
FIG. 9 is an exploded perspective view illustrating main parts in a modified example of a shaft and a chaplet in the pump dispenser according to the embodiment of the present invention.

FIG. 1 is a perspective view illustrating a pump dispenser according to an embodiment of the present invention, FIG. 2 is an exploded perspective view illustrating the pump dispenser according to the embodiment of the present invention, FIG. 3 is a cross-sectional view illustrating the pump dispenser according to the embodiment of the present invention, FIG. 4 is a cross-sectional view illustrating an elastic member in the pump dispenser according to the embodiment of the present invention, FIG. 5 is a side view illustrating a modified example of the elastic member in the pump dispenser according to the embodiment of the present invention, FIGS. 6A and 6B are a side view illustrating another modified example of the elastic member in the pump dispenser according to the embodiment of the present invention, FIGS. 7A and 7B are an operational view illustrating an operating state of a rotation insertion guide part in the pump dispenser according to the embodiment of the present invention, FIGS. 8A and 8B are an operational view illustrating an operating state of a deformation prevention locking part in the pump dispenser according to the embodiment of the present invention, and FIG. 9 is an exploded perspective view illustrating main parts in a modified example of a shaft and a chaplet in the pump dispenser according to the embodiment of the present invention.

As illustrated in FIGS. 1 to 9, the pump dispenser according to the embodiment of the present invention includes a cap part 10, a housing 20, a shaft 30, a chaplet 40, an elastic member 50, and a deformation prevention locking part 60.

The cap part 10 is a component fastened to a container in which the content is stored, and has a through-hole 11 which is formed therein so that a head part 31 of the shaft 30 is movably inserted.

The housing 20 is provided in the cap part 10 to be accommodated in the container and allows the content stored in the container to remain therein to be discharged. The housing 20 is formed to have a hollow pipe and includes an opening and closing valve 21 that opens and closes a passage so that the content stored in the container is suctioned to remain therein when the shaft 30 is moved.

In addition, the shaft 30 is movably accommodated in the housing 20 in an axial direction and includes the head part 31 that discharges the content remaining in the housing 20 outward through a pressing operation by an external force.

That is, when the pressing operation of the head part 31 is performed, the shaft 30 is moved toward the container to suction the content remaining in the housing 20 and then discharges the content to the outside through a nozzle 31a of the head part 31, and when the pressing operation of the head part 31 stops, the shaft 30 is moved and restored by the elastic member 50.

To this end, a piston 32 that selectively opens or closes a flow path so that the content remaining in the housing 20 is introduced is provided on a circumferential surface of the shaft 30.

Meanwhile, the chaplet 40 is provided in the housing 20 so that the shaft 30 may be inserted to pass therethrough, and allows or blocks the movement of the shaft 30 on the basis of a rotation angle of the head part 31.

In this case, the head part 31 may be inserted or prevented from being inserted in the axial direction of the chaplet 40 by the rotation insertion guide part 70 on the basis of the rotation angle. The rotation insertion guide part 70 includes a slide protrusion 71 that is formed to protrude from a circumferential surface of the head part 31, a slide groove 72 that is formed to be recessed in the axial direction in an inner surface of the chaplet 40 such that the slide protrusion 71 is slidably fitted therein, and a locking support groove 73 that is formed to communicate with an end part of the slide groove 72 in a circumferential direction and locks and supports the slide protrusion 71.

That is, when the head part 31 is rotated so that the slide protrusion 71 is positioned in the locking support groove 73, the head part 31 cannot perform the pressing operation and thus the head part 31 may be prevented from being inserted in the axial direction of the chaplet 40, and when the head part 31 is rotated so that the slide protrusion 71 is positioned in the slide groove 72, the head part 31 can perform the pressing operation and thus the head part 31 may be restorably inserted in the axial direction of the chaplet 40.

In addition, an inflow prevention part 80 may prevent the content from flowing between the housing 20 and the chaplet 40. Here, the inflow prevention part 80 includes a plurality of close-contact moving protrusions 81 formed on a circumferential surface of the chaplet 40 to be movable while in close contact with an inner surface of the housing 20, and a pressure guide part 82 that guides the chaplet 40 to press the housing 20 when the chaplet 40 is moved to restrict the pressing operation of the head part 20.

In this case, the pressure guide part 82 includes an inclined part 82a which is formed on the inner surface of the housing 20 and along which an inner diameter of the housing 20 is decreased, and a pressing jaw part 82b formed on the circumferential surface of the chaplet 40 to forcibly press the inclined part 82.

In addition, the elastic member 50 is disposed on the circumferential surface of the shaft 30 to be accommodated in the chaplet 40, and elastically supports the chaplet 40 and the head part 31. The elastic member 50 serves to provide an elastic force to the head part 31 such that when the pressing operation is removed in a state in which the shaft 30 is moved toward the container by the pressing operation of the head part 31, the shaft 30 is moved and restored.

Specifically, as illustrated in FIG. 4, the elastic member 50 includes a first support ring 51 that can be mounted on the chaplet 40 and is supported on the chaplet 40, a second support ring 52 which is spaced apart from the first support ring 51 and supports the head part 31 to be pressed, and a uniform elasticity forming part 53 which is provided between the first support ring 51 and the second support ring 52 to form a uniform elastic restoring force when the head part 31 is pressed by an external force.

In this case, the uniform elasticity forming part 53 includes a plurality of elasticity providing parts 53a vertically disposed between the first support ring 51 and the second support ring 52 to provide an elastic force, wherein pairs of the elasticity providing parts 53a cross obliquely, and posture maintaining parts 53b which are horizontally connected to parts adjacent to the vertically disposed elasticity providing parts 53a, and that move vertically to vary inclinations of the elasticity providing parts 53a such that a posture is maintained when a pressing force is applied to the second support ring 52.

That is, when the pressing force is applied to the head part 31 so that the second support ring 52 is moved toward the first support ring 51, the posture maintaining part 53b receives a load applied to the second support ring 52, is vertically moved together with the second support ring 52 while the posture is maintained, and varies the inclinations of the elasticity providing parts 53a to gradually become gentle. Conversely, when the pressing force applied to the head part 31 is removed in a state in which the second support ring 52 is moved toward the first support ring 51, the elasticity providing parts 53a allow the posture maintaining parts 53b to be vertically moved such that the inclinations are changed by a restoring force to become steep and the posture maintaining parts 53b return to the original positions.

Accordingly, in the process in which the second support ring 52 is moved toward the first support ring 51 by the pressing force applied to the head part 31, the center of gravity is prevented from being biased to either side, and thus it is possible to smoothly guide the elastic movement of the head part 31 for pumping action.

In this case, as illustrated in FIG. 5, the uniform elasticity forming part 53 further includes first posture maintaining and reinforcing parts 53c which are provided in a circular trace at parts of the elasticity providing parts 53a facing the posture maintaining parts 53b in the horizontal direction and disperse the load transmitted to the posture maintaining parts 53b to reinforce the vertical movement posture of the posture maintaining parts 53b.

As a result, since the load applied to the second support ring 52 is dispersed to the posture maintaining parts 53b and the first posture maintaining and reinforcing parts 53c by the pressing of the head part 31, the elastic member 50 may be prevented from being bent in the process of being contracted or extended, and thus may provide a more stable and uniform elastic force.

Further, as illustrated in FIGS. 6A and 6B, the uniform elasticity forming part 53 further includes second posture maintaining and reinforcing parts 53d which are provided at parts where the posture maintaining parts 53b are vertically spaced apart from each other to be elastically deformed and curved by the load transmitted to the posture maintaining parts 53b and to reinforce the vertical movement posture of the posture maintaining parts 53b.

That is, when the posture maintaining parts 53b are moved toward the first support ring 110 so that the inclinations of the elasticity providing parts 53a become gradually gentler, the second posture maintaining and reinforcing parts 53d are deformed to be curved, and are restored while the vertical separation distance of the posture maintaining parts 53b is maintained, at the moment when the pressing force applied to the head part 31 is removed. Accordingly, the elastic member 50 may be prevented from being twisted or bent in the process of being contracted or extended.

Meanwhile, a material of the elastic member 50 is not limited, but it is advantageous for it to be injection molded with a material of a synthetic resin instead of a metal material. Therefore, it is possible to prevent deterioration of the content due to corrosion and to improve the convenience of use because there is no need to separate the content during recycling.

The deformation prevention locking part 60 guides the chaplet 40 to move in the axial direction of the housing 20 when the head part 31 is rotated, and allows or restricts the pressing operation of the head part 31 while preventing the deformation of the elastic member 50.

To this end, the deformation prevention locking part 60 includes a helical groove 61 formed in the inner surface of the housing 20 to be recessed in a helical trace, and a moving protrusion 62 formed to protrude from the circumferential surface of the chaplet 40 to be movably fitted in the helical groove 61.

That is, when the moving protrusion 62 is rotated and moved toward the container along the helical groove 61 due to the rotation of the head part 31, the head part 31 is accommodated in the housing 20, and thus the pressing operation of the head part 31 cannot be performed, and when the moving protrusion 62 is rotated and moved toward the head part 31 along the helical groove 61 due to the rotation of the head part 31, the pressing operation of the head part 31 can be performed.

In this case, a locking member 61a may be formed to protrude from the helical groove 61 such that the moving protrusion 62 may be moved by an external force greater than or equal to a set force. As a result, the head part 31 may be prevented from being arbitrarily rotated due to an external force less than or equal to the set force while protruding from the housing 20.

Meanwhile, as illustrated in FIG. 9, the shaft 30 may be formed to have a hexagonal pillar shape, and the chaplet 40 may include a fitting hole 41 which is formed to have a shape corresponding to the shaft 30 and fitted in the circumferential surface of the shaft 30 to be engaged.

Accordingly, when the head part 31 is rotated in a direction in which the moving protrusion 62 is allowed to be moved in a longitudinal direction of the helical groove 61, the shaft 30 is rotated together with the chaplet 40 while being constrained to the fitting hole 41, and thus rotates and moves the chaplet 40 in the axial direction.

Further, when the head part 31 is forcibly rotated in a state in which the moving protrusion 62 has reached an end part of the helical groove 61, the shaft 30 is rotated at intervals of 60 degrees in the fitting hole 41.

Accordingly, when the head part 31 is forcibly rotated in a state in which the pressing operation of the head part 31 can be performed, it is possible to give the user a sense of overrun at intervals of 60 degrees, and it is also possible to easily match a direction of a label paper attached to the container and a discharge direction of the head part in a state in which the cap part 10 is fastened to the container.

While the present invention has been described with reference to embodiments illustrated in the accompanying drawings, the embodiments should be considered in a descriptive sense only, and it should be understood by those skilled in the art that various alterations and other equivalent embodiments may be made. Therefore, the scope of the present invention should be defined only by the following claims.

The invention claimed is:

1. A pump dispenser comprising:
a cap part fastened to a container;
a housing which is provided at the cap part and in which a content stored in the container remains and is dischargeable;
a shaft which is accommodated in the housing to be movable in an axial direction of the housing and includes a head part for discharging the content remaining in the housing outward through a pressing operation by an external force;
a chaplet that is provided in the housing for the shaft to be inserted to pass through the housing and allows or blocks movement of the shaft on a basis of a rotation angle of the head part;
an elastic member that is provided on a circumferential surface of the shaft and elastically supports the chaplet and the head part; and
a deformation prevention locking part that guides the chaplet to move in the axial direction of the housing at the time of rotation of the head part and allows or restricts the pressing operation of the head part while preventing deformation of the elastic member,
wherein the head part is inserted or prevented from being inserted in an axial direction of the chaplet on the basis of the rotation angle by a rotation insertion guide part,
wherein the rotation insertion guide part includes:
a slide protrusion formed to protrude from a circumferential surface of the head part;
a slide groove formed to be recessed in the axial direction in an inner surface of the chaplet for the slide protrusion to be slidably fitted in the chaplet; and
a locking support groove formed to communicate with an end part of the slide groove in a circumferential direction and configured to lock and support the slide protrusion.

2. A pump dispenser comprising:
a cap part fastened to a container;
a housing which is provided at the cap part and in which a content stored in the container remains and is dischargeable;
a shaft which is accommodated in the housing to be movable in an axial direction of the housing and includes a head part for discharging the content remaining in the housing outward through a pressing operation by an external force;
a chaplet that is provided in the housing for the shaft to be inserted to pass through the housing and allows or blocks movement of the shaft on a basis of a rotation angle of the head part;
an elastic member that is provided on a circumferential surface of the shaft and elastically supports the chaplet and the head part; and
a deformation prevention locking part that guides the chaplet to move in the axial direction of the housing at the time of rotation of the head part and allows or restricts the pressing operation of the head part while preventing deformation of the elastic member,
wherein the deformation prevention locking part includes:
a helical groove formed in an inner surface of the housing to be recessed in a helical trace; and
a moving protrusion formed to protrude from a circumferential surface of the chaplet to be movably fitted in the helical groove.

3. The pump dispenser of claim 1, wherein a locking member is formed to protrude from the helical groove such that the moving protrusion is allowed to be moved by an external force greater than or equal to a set force.

4. A pump dispenser comprising:
a cap part fastened to a container;
a housing which is provided at the cap part and in which a content stored in the container remains and is dischargeable;
a shaft which is accommodated in the housing to be movable in an axial direction of the housing and includes a head part for discharging the content remaining in the housing outward through a pressing operation by an external force;
a chaplet that is provided in the housing for the shaft to be inserted to pass through the housing and allows or blocks movement of the shaft on a basis of a rotation angle of the head part;
an elastic member that is provided on a circumferential surface of the shaft and elastically supports the chaplet and the head part; and
a deformation prevention locking part that guides the chaplet to move in the axial direction of the housing at the time of rotation of the head part and allows or restricts the pressing operation of the head part while preventing deformation of the elastic member,
wherein an inflow prevention part prevents the content from flowing between the housing and the chaplet,
wherein the inflow prevention part includes:
a plurality of close-contact moving protrusions formed on the circumferential surface of the chaplet to be movable while in close contact with an inner surface of the housing; and
a pressure guide part configured to guide the chaplet to press the housing when the chaplet is moved to restrict the pressing operation of the head part.

5. The pump dispenser of claim 1, wherein the elastic member includes:
- a first support ring configured to be accommodated and supported in the chaplet;
- a second support ring spaced apart from the first support ring and configured to support the head part to be pressed; and
- a uniform elasticity forming part provided between the first support ring and the second support ring and configured to form a uniform elastic restoring force when the head part is pressed by the external force.

6. The pump dispenser of claim 5, wherein the uniform elasticity forming part includes:
- a plurality of elasticity providing parts vertically disposed between the first support ring and the second support ring to provide an elastic force, wherein pairs of the elasticity providing parts obliquely cross; and
- posture maintaining parts which are horizontally connected to parts adjacent to the vertically disposed elasticity providing parts, and that move vertically to vary inclinations of the elasticity providing parts such that a posture is maintained when a pressing force is applied to the second support ring.

* * * * *